(12) United States Patent
Patrick et al.

(10) Patent No.: US 10,615,666 B2
(45) Date of Patent: *Apr. 7, 2020

(54) INTERNAL CLOSED LOOP COOLING

(71) Applicant: CANRIG DRILLING TECHNOLOGY LTD., Houston, TX (US)

(72) Inventors: Charles Patrick, Houston, TX (US); Kevin Williams, Houston, TX (US)

(73) Assignee: Canrig Drilling Technology Ltd., Houston, TX (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/703,659

(22) Filed: Sep. 13, 2017

(65) Prior Publication Data

US 2018/0006531 A1 Jan. 4, 2018

Related U.S. Application Data

(63) Continuation of application No. 14/615,131, filed on Feb. 5, 2015, now Pat. No. 9,793,781.

(60) Provisional application No. 61/936,733, filed on Feb. 6, 2014.

(51) Int. Cl.
*H02K 9/00* (2006.01)
*H02K 9/18* (2006.01)
*H02K 5/20* (2006.01)

(52) U.S. Cl.
CPC ............... *H02K 9/18* (2013.01); *H02K 5/20* (2013.01)

(58) Field of Classification Search
CPC ............... H02K 9/19; H02K 9/12; H02K 9/18

USPC ......................................... 310/58–59, 64, 89
See application file for complete search history.

(56) References Cited

U.S. PATENT DOCUMENTS

| | | | | |
|---|---|---|---|---|
| 4,115,030 A * | 9/1978 | Inagaki | ................ | F04D 29/281 310/51 |
| 4,700,092 A * | 10/1987 | Bincoletto | ............... | H02K 5/15 310/54 |
| 5,111,094 A * | 5/1992 | Patel | ...................... | H02K 1/278 29/598 |
| 5,859,482 A * | 1/1999 | Crowell | ................... | H02K 5/20 310/54 |
| 6,191,511 B1 * | 2/2001 | Zysset | ...................... | H02K 9/19 310/53 |
| 6,300,693 B1 * | 10/2001 | Poag | ........................ | H02K 5/20 310/54 |
| 7,965,002 B2 * | 6/2011 | Savant | ..................... | H02K 5/20 310/52 |
| 8,937,414 B2 * | 1/2015 | Song | ......................... | H02K 1/20 310/58 |
| 9,793,781 B2 * | 10/2017 | Patrick | ..................... | H02K 9/18 |
| 2006/0066156 A1 * | 3/2006 | Dong | ........................ | H02K 9/20 310/54 |
| 2008/0111434 A1 * | 5/2008 | Head | ...................... | E21B 43/128 310/87 |
| 2011/0278971 A1 * | 11/2011 | Matsumoto | .............. | H02K 5/08 310/64 |

(Continued)

*Primary Examiner* — Thanh Lam
(74) *Attorney, Agent, or Firm* — Adolph Locklar

(57) ABSTRACT

An electric motor having internal closed loop cooling includes a cooling chamber coupled to the stator cover of the electric motor. A fan is positioned to circulate air through the interior of the electric motor and the cooling chamber. A heat sink in the cooling chamber removes heat from the circulating air. The heat sink may be coupled to a fluid cooling jacket to transfer heat thereto or therefrom.

16 Claims, 3 Drawing Sheets

(56) References Cited

U.S. PATENT DOCUMENTS

2012/0194014 A1* 8/2012 Lang .................. H02K 9/06
310/59

* cited by examiner

INTERNAL CLOSED LOOP COOLING

CROSS-REFERENCE TO RELATED APPLICATIONS

This application is a continuation application which claims priority from U.S. utility application Ser. No. 14/615,131, filed Feb. 5, 2015, which is itself a nonprovisional application which claims priority from U.S. provisional application No. 61/936,733, filed Feb. 6, 2014.

TECHNICAL FIELD/FIELD OF THE DISCLOSURE

The present disclosure relates generally to electric motors, and specifically to the cooling of electric motors.

BACKGROUND OF THE DISCLOSURE

In general, electric motors operate by rotating a rotor relative to a fixed stator by varying the orientation of a magnetic field induced by one or more windings. In some electric motors, both the rotor and stator include windings. In such an induction motor, the magnetic field induced by the stator windings induces current within the rotor windings which, due to Lenz's law, causes a resultant torque on the rotor, thus causing rotation.

In a permanent magnet motor, on the other hand, the rotor includes one or more permanent magnets. The permanent magnets, in attempting to align with the magnetic field induced by the windings in the stator, cause a resultant torque on the rotor. By varying the orientation of the magnetic field, the rotor may thus be caused to rotate. In high-torque permanent magnet motors, multiple permanent magnets may be positioned on the exterior of the rotor (for an internal rotor permanent magnet motor).

While in operation, the components of the electric motor may heat up in response to, for example, electrical resistance in the stator windings, mechanical friction, etc.

SUMMARY

The present disclosure provides for an electric motor having internal closed loop cooling. The electric motor may include a rotor; a stator; a stator cover, the stator cover positioned generally around the stator and at least partially extending beyond the length of the stator; a motor housing, the space between the motor housing and the stator cover defining an internal cooling chamber.

The present disclosure also provides for an electric motor having internal closed loop cooling. The electric motor may include a rotor, the rotor including a rotor body having a plurality of permanent magnets coupled thereto; a stator, the stator including a plurality of windings; a stator cover, the stator cover positioned generally around the stator and at least partially extending beyond the length of the stator; a fluid cooling jacket, the fluid cooling jacket positioned generally about the stator cover; a motor housing, the space between the motor housing and the stator cover defining an internal cooling chamber; a heat sink, the heat sink positioned within the internal cooling chamber, the heat sink coupled directly to the fluid cooling jacket; a motor air supply passage and a motor air return passage, the motor air supply passage and motor air return passage formed as apertures between the interior of the stator cover and the internal cooling chamber; a chamber separator plate, the chamber separator plate positioned to separate the portion of the internal cooling chamber having the motor air supply passage from the portion of the internal cooling chamber having the motor air return passage, the chamber separator plate including an aperture; and a cooling fan coupled to the aperture in the chamber separator plate, the cooling fan positioned to circulate air through the interior of the electric motor, the air entering the interior of the electric motor via the motor air supply passage and exiting via the motor air return passages.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
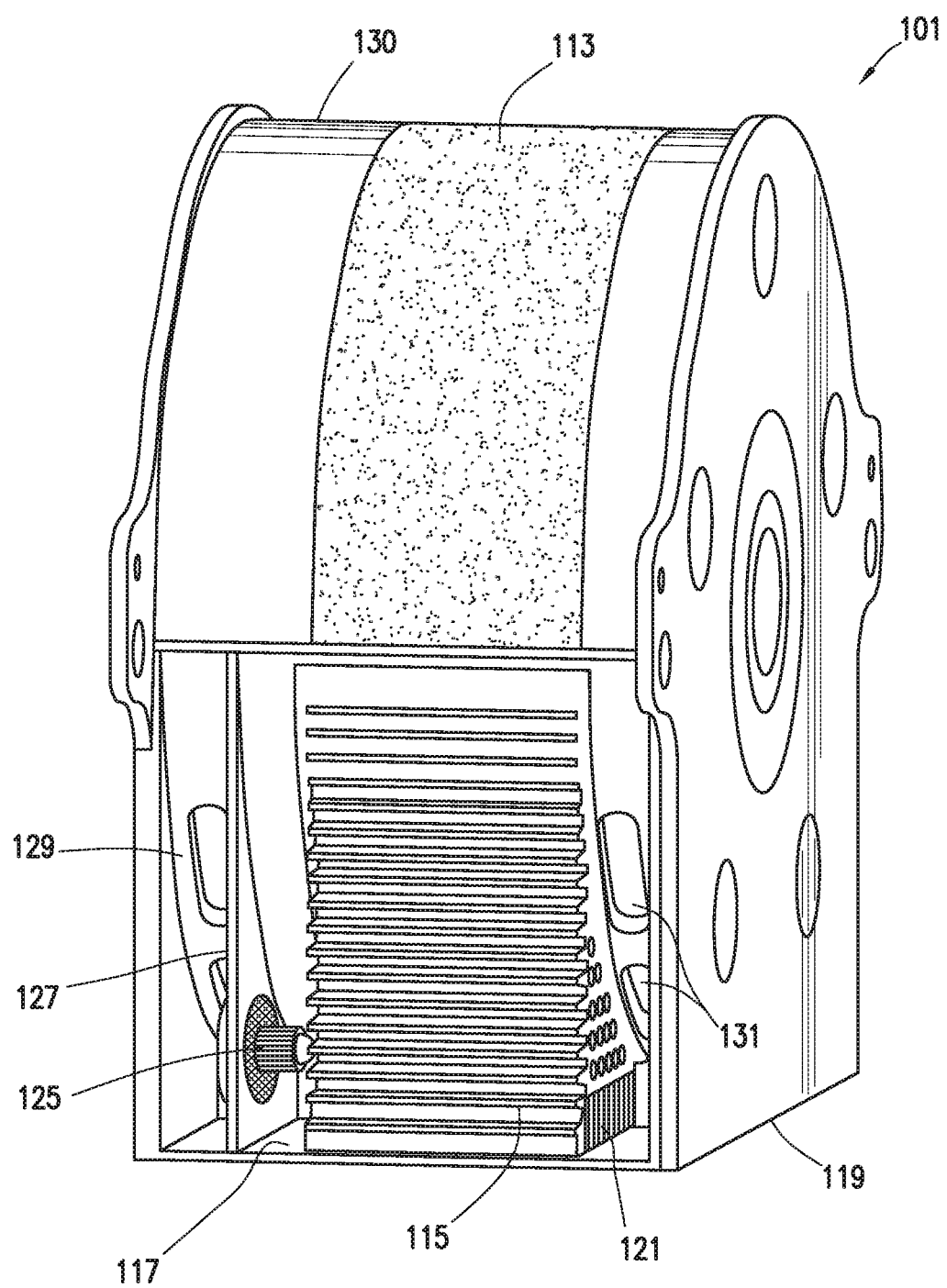
FIG. 1 depicts an electric motor (with front panel removed) consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
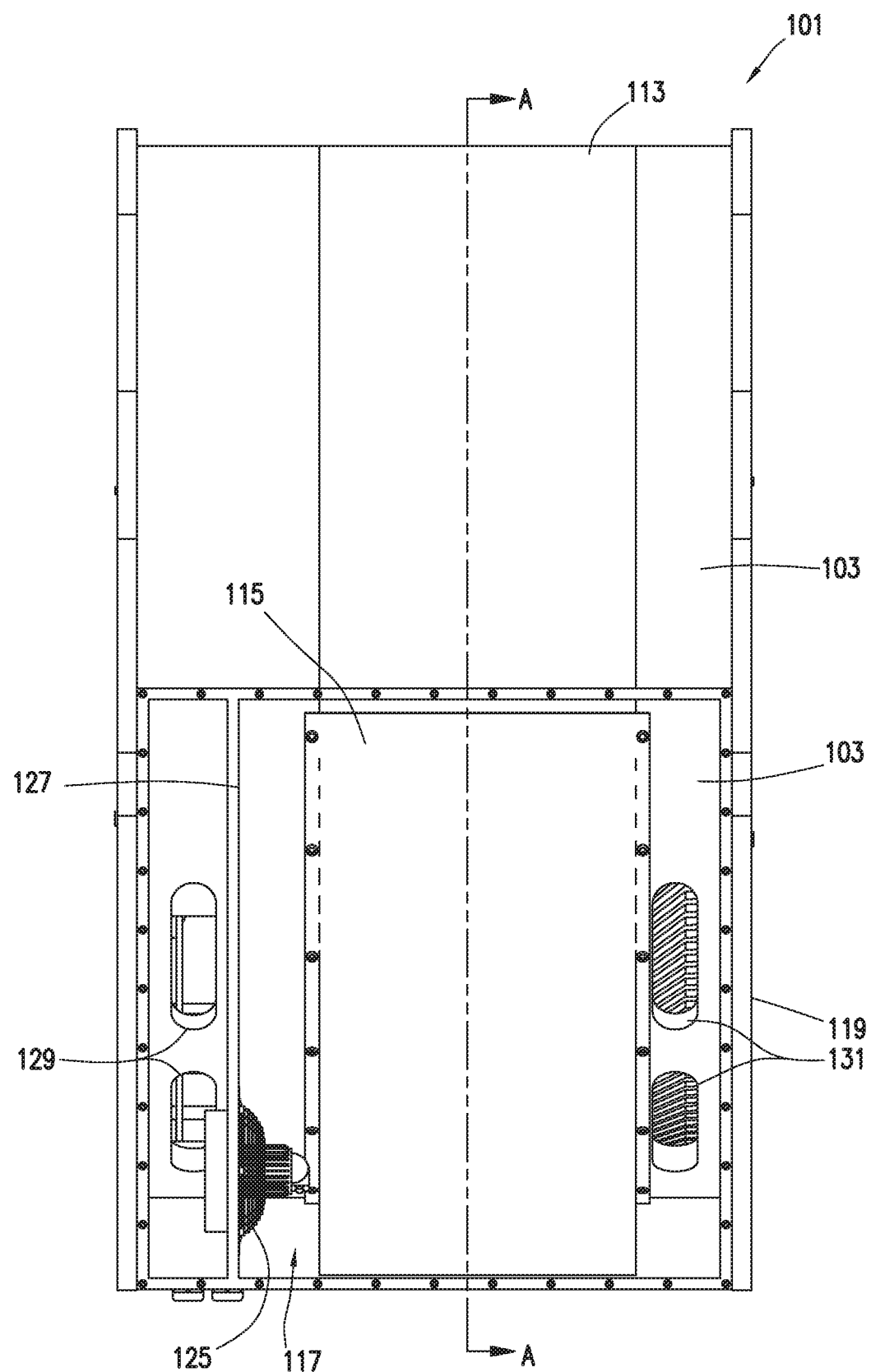
FIG. 2 depicts a plan view of the electric motor of FIG. 1.
Figure 3:
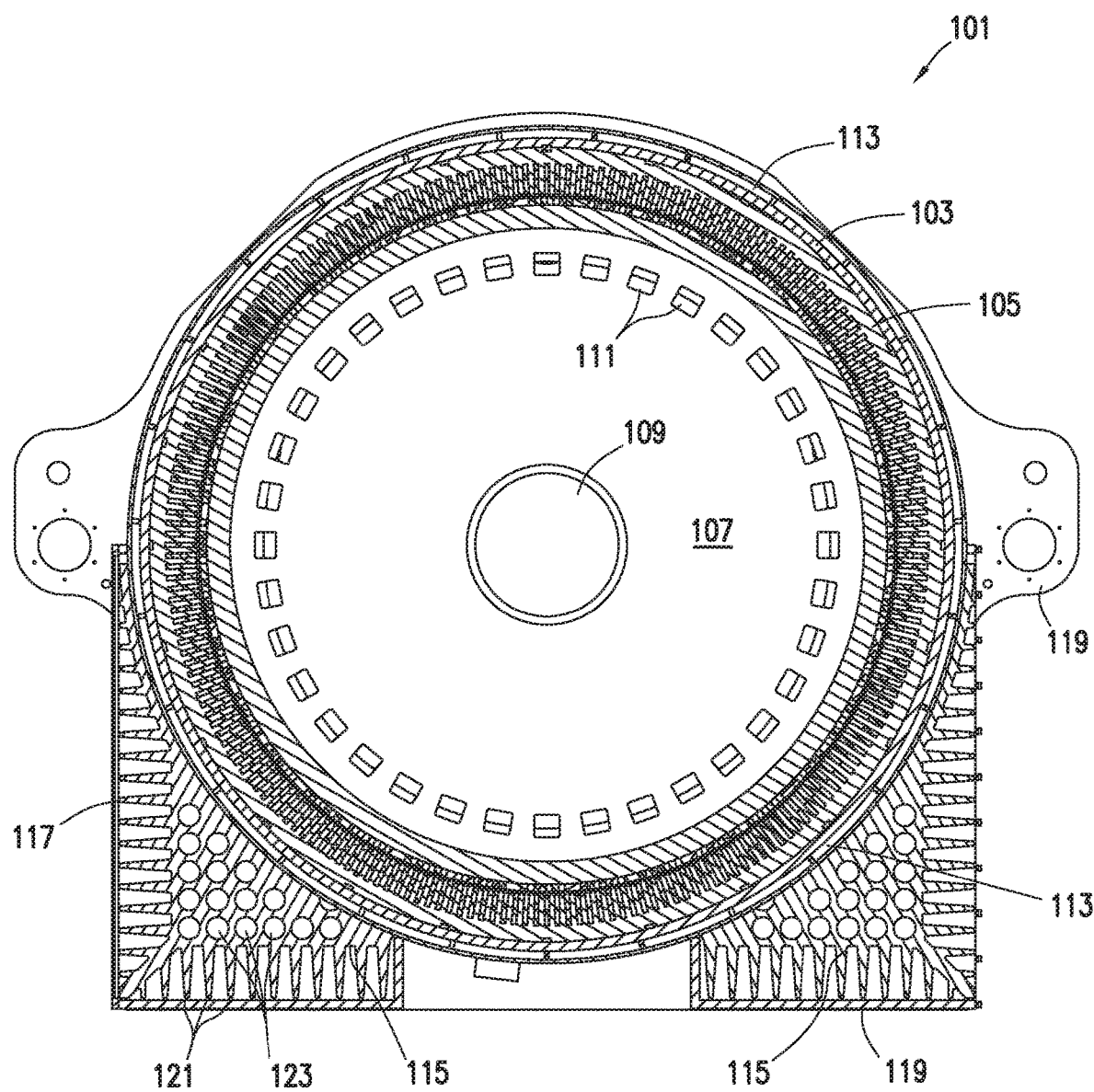
FIG. 3 depicts a cross section view of the electric motor of FIG. 2, taken at line A-A.

As depicted in FIGS. 1-3, electric motor 101 may include stator cover 103. Stator cover 103 may be a positioned about stator 105. Stator 105, as understood in the art, may include a plurality of windings positioned to induce electromagnetic fields and cause rotation of rotor 107. Rotor 107 may be coupled to output shaft 109. In some embodiments, rotor 107 may include one or more rotor air passages 111. Rotor air passages 111 may be positioned within the body of rotor 107 to, for example, allow a flow path for air circulation to assist in cooling the rotor.

In some embodiments, fluid cooling jacket 113 may be positioned about stator cover 103. Fluid cooling jacket 113 may include one or more channels through which a coolant fluid may be flowed. Fluid cooling jacket 113 may be positioned to, for example, assist in cooling stator 105 and stator cover 103 by conductive and convective heat transfer therefrom. Fluid cooling jacket 113 may utilize any fluid suitable for cooling stator 105 and stator cover 103, and may include, for example and without limitation, water or a water-glycol mixture. In some embodiments of the present disclosure, fluid cooling jacket 113 may be coupled to one or more heat sinks 115. In some embodiments, heat sink 115 is coupled directly to the outer surface of fluid cooling jacket 113. In some embodiments, heat sink 115 is positioned about a portion of the outer surface of fluid cooling jacket 113. Heat sink 115 may be positioned to, for example, increase the surface area of the outer surface of fluid cooling jacket 113 to, for example, increase heat transfer from electric motor 101.

In some embodiments, heat sink 115 may be positioned within internal cooling chamber 117. In some embodiments, internal cooling chamber 117 may be bounded by motor housing 119 and by stator cover 103. In some embodiments, a removable cooling chamber panel (not shown) may be used to allow access to internal cooling chamber 117 for, for example, assembly or maintenance purposes. FIGS. 1, 2 depict electric motor 101 having the removable cooling chamber panel removed for clarity. In some embodiments, heat sink 115 may be formed with a plurality of fins 121 to increase surface area. In some embodiments, heat sink 115 may be formed with one or more air passages 123 through the body of heat sink 115 to, for example, increase surface area.

In some embodiments, cooling fan 125 may be positioned within internal cooling chamber 117 to, for example, provide forced convection across heat sink 115. In some embodiments, cooling fan 125 may be positioned on chamber separator plate 127. Chamber separator plate 127 may serve as a mounting point for cooling fan 125. Cooling fan 125 may be coupled to an aperture formed in chamber separator plate 127.

In some embodiments, stator cover 103 may include one or more openings between the interior of electric motor 101 and internal cooling chamber 117. In some embodiments, openings on one side of chamber separator plate 127 may form motor air supply passages 129. Motor air supply passages 129 may allow air from internal cooling chamber 117 to flow, for example, through rotor air passages 111, between rotor 107 and stator 105, etc. to, for example, remove heat therefrom. In some embodiments, one or more openings between the interior of electric motor 101 and internal cooling chamber 117 on the opposite side of chamber separator plate 127 from motor air supply passages 129 may form motor air return passages 131. Motor air return passages 131 may allow air from the interior of electric motor 101 to return to internal cooling chamber 117. In some embodiments, cooling fan 125 may provide the motive force to cause air to circulate through the interior of electric motor 101 and internal cooling chamber 117. In some embodiments, rotor 107 may include a fan component positioned to cause air circulation. In some such embodiments, rotor 107 may include a centrifugal fan component positioned at or near motor air return passages 131.

In some embodiments, fluid cooling jacket 113 may be coupled to a circulating fluid cooling system. In such embodiments, heat sink 115 may be positioned to remove heat from the circulating air and transfer that heat to fluid cooling jacket 113.

In some embodiments, internal cooling chamber 117 may remain closed to the environment surrounding electric motor 101 during normal operation. Sealing internal cooling chamber 117 may, for example, prevent debris, fluids, or other materials from being pulled into the interior of electric motor 101, from reducing heat transfer from electric motor 101, etc.

In some embodiments, internal cooling chamber 117 may be formed as an integral part of motor housing 119. In other embodiments, an existing electric motor may be retrofitted by, for example, coupling an internal closed loop cooling chamber housing to the stator cover of the existing electric motor. In such an embodiment, apertures for motor air supply and for motor air return passages may be cut into the existing stator cover. In some such embodiments, heat sinks may be coupled to the fluid cooling jacket of the existing electric motor. In some such embodiments, a cooling fan may be included as previously discussed.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. An electric motor having internal closed loop cooling, the electric motor comprising:
   a rotor;
   a stator;
   a stator cover, the stator cover positioned generally around the stator and at least partially extending beyond the length of the stator, wherein the stator cover includes openings therethrough and wherein the openings include a motor air supply passage and a motor air return passage;
   a motor housing, wherein a space between the motor housing and the stator cover defines an internal cooling chamber, wherein the internal cooling chamber is in communication with the interior of the electric motor via the motor air supply passage and the motor air return passage; and
   a fluid cooling jacket positioned about the stator cover.

2. The electric motor of claim 1, further comprising a heat sink positioned within the internal cooling chamber and directly coupled to an outer surface of the fluid cooling jacket, wherein the heat sink is positioned between the motor air supply passage and the motor air return passage, and wherein the heat sink includes at least one air passage therethrough.

3. The electric motor of claim 1, wherein the heat sink comprises a body and a plurality of fins positioned to increase the surface area of the heat sink.

4. The electric motor of claim 1, wherein the fluid cooling jacket is coupled to a circulating fluid cooling system.

5. The electric motor of claim 1, wherein the rotor comprises a centrifugal fan component, the centrifugal fan component positioned to circulate air through the interior of the electric motor by forcing air through the motor air return passage, through the internal cooling chamber, and back into the interior of the electric motor via the motor air supply passage.

6. The electric motor of claim 1, wherein the rotor further comprises a rotor cooling passage.

7. The electric motor of claim 1, wherein the motor housing comprises a removable panel positioned to allow access to the internal cooling chamber.

8. The electric motor of claim 1, wherein the internal cooling chamber is sealed from the environment surrounding the electric motor.

9. The electric motor of claim 1, wherein the electric motor comprises a permanent magnet electric motor, and the rotor includes a rotor body having a plurality of permanent magnets coupled thereto.

10. An electric motor having internal closed loop cooling, the electric motor comprising:
- a rotor, the rotor including a rotor body having a plurality of permanent magnets coupled thereto;
- a stator, the stator including a plurality of windings;
- a stator cover, the stator cover positioned generally around the stator and at least partially extending beyond the length of the stator;
- a fluid cooling jacket, the fluid cooling jacket positioned generally about the stator cover;
- a motor housing, the space between the motor housing and the stator cover defining an internal cooling chamber;
- a heat sink, the heat sink positioned within the internal cooling chamber, the heat sink coupled directly to the fluid cooling jacket;
- a motor air supply passage and a motor air return passage, the motor air supply passage and motor air return passage formed as apertures between the interior of the stator cover and the internal cooling chamber; and
- a chamber separator plate, the chamber separator plate positioned to separate the portion of the internal cooling chamber having the motor air supply passage from the portion of the internal cooling chamber having the motor air return passage, the chamber separator plate including an aperture.

11. The electric motor of claim 10, wherein the heat sink comprises a body and a plurality of fins positioned to increase the surface area of the heat sink.

12. The electric motor of claim 11, wherein the heat sink comprises a body and at least one air passage formed through the body of the heat sink.

13. The electric motor of claim 10, wherein the fluid cooling jacket is coupled to a circulating fluid cooling system.

14. The electric motor of claim 10, wherein the internal cooling chamber is sealed from the environment surrounding the electric motor.

15. The electric motor of claim 10, wherein the motor housing comprises a removable panel positioned to allow access to the internal cooling chamber.

16. The electric motor of claim 10, wherein the rotor further comprises a rotor cooling passage formed through the rotor body.

* * * * *

UNITED STATES PATENT AND TRADEMARK OFFICE
CERTIFICATE OF CORRECTION

PATENT NO. : 10,615,666 B2  
APPLICATION NO. : 15/703659  
DATED : April 7, 2020  
INVENTOR(S) : Patrick et al.

Page 1 of 1

It is certified that error appears in the above-identified patent and that said Letters Patent is hereby corrected as shown below:

On the Title Page

Item (73) Assignee:  
CANRIG DRILLING TECHNOLOGY LTD.

Should be replaced with:  
NABORS DRILLING TECHNOLOGIES USA, INC.

Signed and Sealed this  
Fifth Day of May, 2020

Andrei Iancu  
*Director of the United States Patent and Trademark Office*